US007395209B1

(12) United States Patent
Mesarovic et al.

(10) Patent No.: US 7,395,209 B1
(45) Date of Patent: Jul. 1, 2008

(54) FIXED POINT AUDIO DECODING SYSTEM AND METHOD

(75) Inventors: Vladimir Z. Mesarovic, Austin, TX (US); Miroslav V. Dokic, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1519 days.

(21) Appl. No.: 09/570,374

(22) Filed: May 12, 2000

(51) Int. Cl.
G10L 19/00 (2006.01)
(52) U.S. Cl. ............... 704/500; 704/501; 704/503; 704/504
(58) Field of Classification Search .......... 375/243; 341/67; 704/500, 501, 503, 504
See application file for complete search history.

(56) References Cited

U.S. PATENT DOCUMENTS

| | | | | |
|---|---|---|---|---|
| 4,983,037 A | * | 1/1991 | Messing et al. | 356/73.1 |
| 5,604,691 A | * | 2/1997 | Dworkin et al. | 708/277 |
| 5,630,005 A | | 5/1997 | Ort | |
| 5,960,401 A | | 9/1999 | Rao | |
| 5,963,154 A | * | 10/1999 | Wise et al. | 341/67 |
| 5,963,596 A | * | 10/1999 | Benbassat et al. | 375/243 |
| 6,009,389 A | | 12/1999 | Dokic et al. | |
| 6,012,142 A | | 1/2000 | Dokic et al. | |

OTHER PUBLICATIONS

ISO/IEC 11172-3, international standard for coding of moving pictures and associated audio for digital storage media at up to about 1.5 Mbit/s, Part 3: Audio, 1993, p. 28-29, 34, 40-41,54.*
Peter Noll, "Digital audio for multimedia", proceedings signal processing for multimedia, NATO Advanced audio institute, 1999.*
STA013/013B/013T, MPEG 2.5 layer III audio decoder, products by STMicoroelectronics Group of Companies, 1999.*
ISO/IEC CD 14496-3 Subpart 4.
Stefan Geyersberger, et al., "MPEG-2 AAC Multichannel Realtime Implementation on Floating Point DSPs," Convention, Munich, DE, May 8-11, 1999, 8 pgs., Audio Engineering Society, New York, NY.
Dae-Young Jang, et al., "A Multichannel Audio Codec System for Multichannel Audio Authoring,": Convention, May 8-11, 1999, Munich, DE, 5 pgs., Audio Engineering Society, New York, NY.

* cited by examiner

*Primary Examiner*—Talivaldis Ivars Smits
*Assistant Examiner*—Qi Han
(74) *Attorney, Agent, or Firm*—James J. Murphy; Thompson & Knight, LLP

(57) ABSTRACT

A digital audio decoder for receiving an encoded audio signal and decoding the audio signal. The digital audio decoder uses both real time computations and calculations pre-stored in a look-up table to decode the encoded audio signal. The digital audio decoder uses fixed point arithmetic but a variable word format to represent the intermediate computations and pre-stored look-up table entries.

15 Claims, 5 Drawing Sheets

FIXED POINT AUDIO DECODING SYSTEM AND METHOD

INCORPORATION BY REFERENCE

The following commonly-assigned patents and patent applications are hereby incorporated by reference in herein:

U.S. Pat. No. 6,009,389, issued Dec. 28, 1999 to Dokic, et al.;

U.S. Pat. No. 6,012,142, issued Jan. 4, 2000 to Dokic, et al.;

U.S. Pat. No. 5,960,401, issued Sep. 28, 1999 to Rao & Dokic;

Ser. No. 08/970,979, entitled "DIGITAL AUDIO DECODING CIRCUITRY, METHODS AND SYSTEMS, filed Nov. 14, 1997;

Ser. No. 08/970,372, entitled "METHODS FOR DEBUGGING A MULTIPROCESSOR SYSTEM, filed Nov. 14, 1997;

Ser. No. 08/969,883, entitled "INTER-PROCESSOR COMMUNICATION CIRCUITRY AND METHODS, filed Nov. 14, 1997; and Ser. No. 08/969,884, entitled "METHODS FOR UTILIZING SHARED MEMORY IN A MULTIPROCESSOR SYSTEM, filed Nov. 14, 1997.

FIELD OF THE INVENTION

The invention and the accompanying specification lies generally in the field of digital audio coding and decoding. It relates specifically a system and method for implementing an audio decoding system and method using fixed-point arithmetic.

BACKGROUND

Audio support is provided for many modern computer, telephony, and other electronics applications. An important component in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder provides the proper hardware and software interfaces to communicate with the possible compressed (and decompressed) data sources, as well as the destination digital and/or audio devices.

SUMMARY

The specification provided here describes embodiments for decoding digital audio signals using a fixed-point architecture and arithmetic. To optimize memory utilization and computation/processing requirements, the embodiments described in this specification adopt a mixed table/computation approach, in which over certain ranges, the variables used in the computations to decode the coded audio stream, the variables are calculated, thereby reducing memory usage, and over other ranges the variables are stored in a look-up table, to minimize computational load. For example, in certain of the formulas used in the decoding process, which are described below in greater detail, the result of $x^{4/3}$ must be used in the overall computation. Typically, the approximate useful range of the input variable is known. For example, x might be an element of the set [−8191, 8191]. It is desirable to be able to calculate y using the optimal combination of processing requirements and memory. In many audio decoding embodiments, the occurrence of x would not be evenly distributed across its range, but for instance 70% of x occurrences might be distributed about [−127, 127] and 80% of x occurrences might be within the range [−255, 255]. In disclosed embodiments, a 512 element table is used to represent the most-frequently occurring instances of x, but the remaining portion of the x range is preferably computed using a Taylor series expansion or other method. By using the combination of table look-up and calculation, the tables can be used for their speed for the majority of the instances, but the use of computation reduces the size of the tables relative to the size that would be required for the exclusive table look-up approach. In other words, tables can be used to decrease the amount of processing capacity required to determine an output variable by "looking-up" the output variable rather than computing it. Sometimes the term "MIPS," which stands for Million (or Mega) Instructions Per Second is used in the art to describe the amount of processing capacity that is available or needed for a certain task. Thus, a process that requires less work by the microprocessors is said to conserve "MIPS." Thus, in the description below, "MIPS" may be used to refer generically to processing capacity. The use of this generic term does not imply a certain processing speed range in the millions of instructions per second range, and in fact the claimed invention may be applied to systems having processing capacities that exceed or come short of the millions of instructions per second processing capacity.

Also described are embodiments for minimizing the memory used in an audio decoding application for Pulse Code Modulation ("PCM") buffering. When digital signals are decoded for playback, there will be a time during which the digital samples must be processed. After processing some number of the digital samples, the decoded playback can occur. To continue the streaming of the audio, playback and processing must simultaneously occur. To accomplish the simultaneous playback and processing/decoding, a buffer for the PCM data must be provided. The audio playback occurs directly from the PCM data. The amount of PCM buffering that is provided will is generally depend on how long it will take to process/decode additional digital signals. Embodiments described in this application provide a system and method for minimizing the amount of such PCM buffering that is required.

Often in audio decoding applications, a Digital Signal Processor ("DSP") is provided having on-board memory that may be used for PCM buffering along with other temporary data storage uses. It may, however, be useful to interface the DSP or other processor to external memory, either to replace or supplement the on-board memory. Described in this application is a system and method for interfacing that external memory for audio decoding which minimize the processing requirements on the DSP or other processor.

Figure 1A:
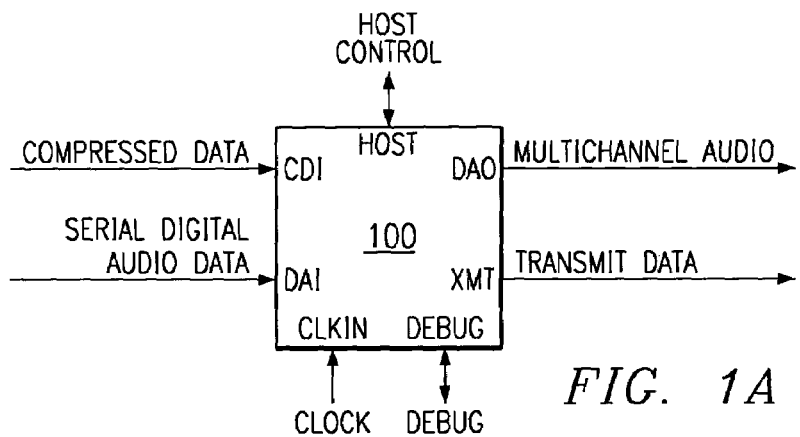
FIG. 1A is a diagram of a general multichannel audio decoder.

All of these drawings are drawings of certain embodiments. The scope of the claims are not to be limited to the specific embodiments illustrated in the drawing and described below.

DESCRIPTION OF THE PREFERRED EMBODIMENTS

FIG. 1A is a general overview of an audio information decoder 100. Decoder 100 is operable to receive data in any one of a number of formats, including compressed data conforming, for example, to the MPEG-4 AAC algorithm and AC-3 digital audio compression standard, (as defined by the United States Advanced Television System Committee) through a Compressed Data Input port ("CDI"). An independent Digital Audio Input ("DAI") port provides for the input of PCM, S/PDIF, or non-compressed digital audio data.

A digital audio output ("DAO") port provides for the output of multiple-channels of decompressed digital audio data. Independently, decoder 100 can transmit data in an S/PDIF ("Sony-Phillips Digital Interface") format, for example, through a transmit port XMT.

Decoder 100 operates under the control of a host microprocessor through a host port "HOST" and supports debugging by an external debugging system through the debug port "DEBUG." The "CLK" port supports the input of a master clock for generation of the timing signals within decoder 100.

Figure 1B:
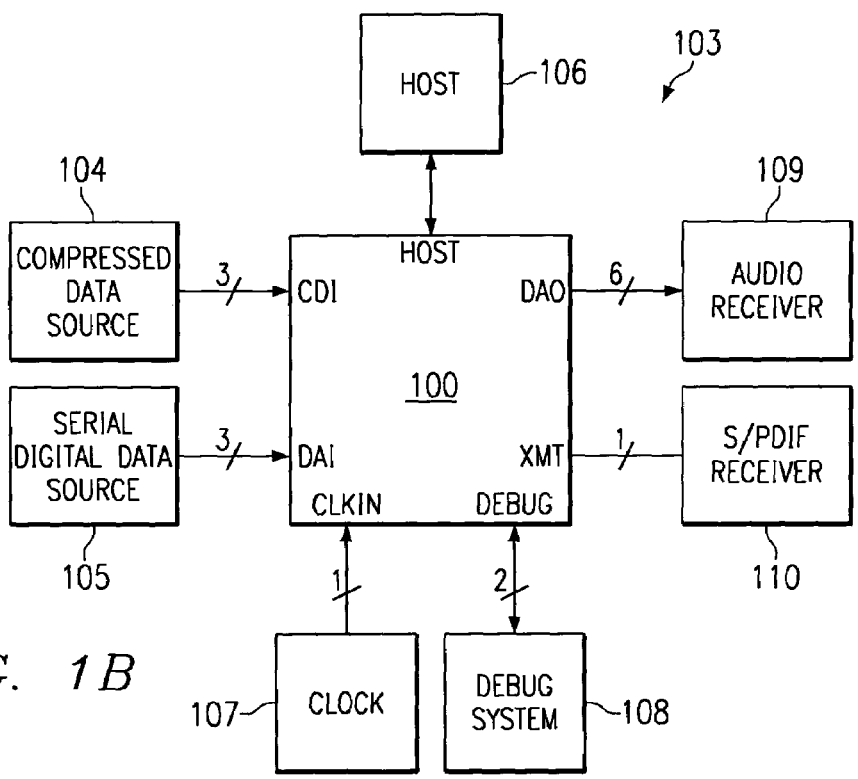
FIG. 1B is a diagram showing the decoder of FIG. 1A in an exemplary system.

FIG. 1B shows decoder 100 embodied in a representative system 103. Decoder 100 as shown includes three Compressed Data Input (CDI) pins for receiving compressed data from a compressed audio data source 104 and an additional three Digital Audio Input (DAI) pins for receiving serial digital audio data from a digital audio sources 105. Examples of compressed serial digital audio source 105, and in particular of AAC compressed digital sources, are satellite and terrestrial digital TV and radio broadcasting and internet.

The HOST port allows coupling to a host processor 106, which is generally a microcontroller or microprocessor that maintains control over the audio system 103. For instance, in one embodiment, host processor 106 is the microprocessor in a Personal Computer ("PC") and System 103 is a PC-based sound system. In another embodiment, host processor 106 is a microcontroller in an audio receiver or controller unit and system 103 is a non-PC-based entertainment system, such as conventional home entertainment systems produced by Sony, Pioneer, and others. A master clock, shown here, is generated externally by clock source 107. The DEBUG port consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codecs for transmission to analog receiver circuitry.

Figure 1C:
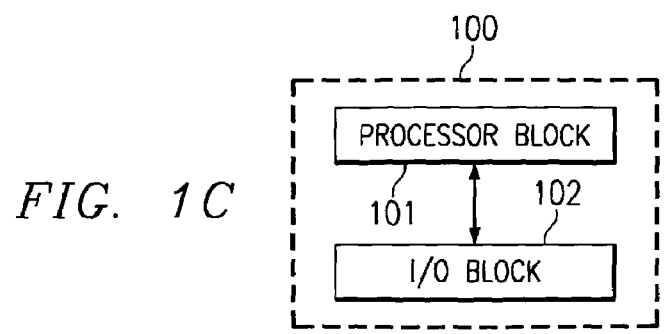
FIG. 1C is a diagram showing the partitioning of the decoder into a processor block and an input/output (I/O) block.

FIG. 1C is a high level functional block diagram of a multichannel preferred embodiment audio decoder 100. Decoder 100 is divided into two major sections, a Processor Block 101 and an I/O Block 102. Processor Block 101 includes two DSP cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
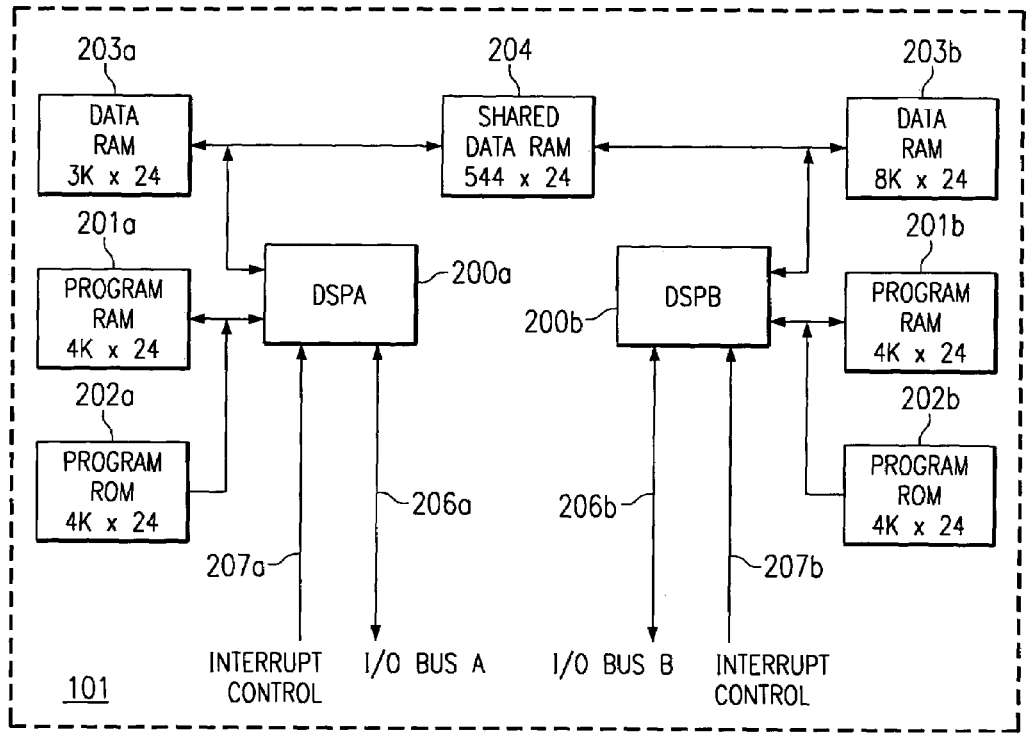
FIG. 2 is a diagram of the processor block of FIG. 1C.

FIG. 2 is a detailed functional block diagram of processor block 101. Processor block 101 includes two DSP cores 200a and 200b, labeled DSP-A and DSP-B respectively. Cores 200a and 200b preferably operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b.

Figure 3:
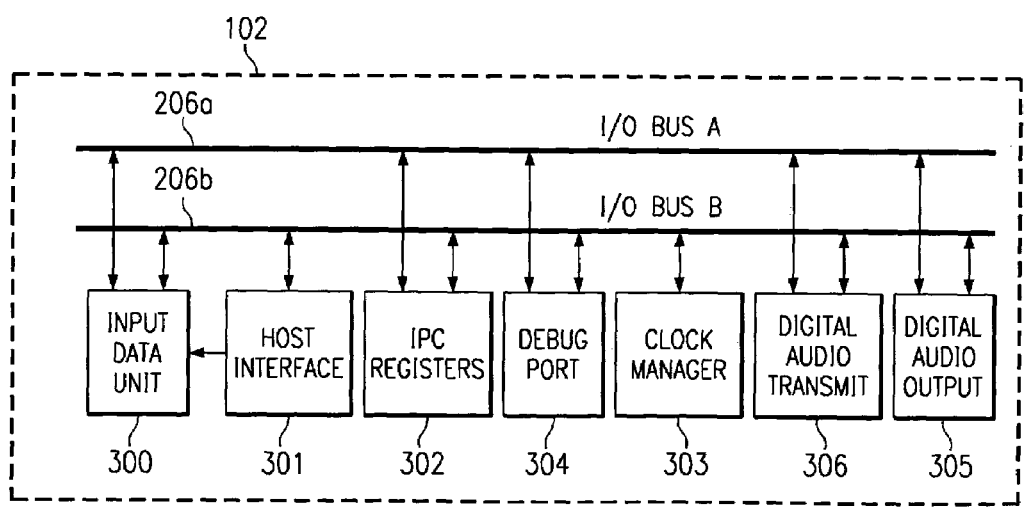
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 300 accepts either compressed analog data or digital audio in any one of several input formats (from either the CDI or DAI ports). Serial/parallel host interface 301 allows an external controller to communicate with decoder 100 through the HOST port. Data received at the host interface port 301 can also be routed to Input Data Unit 300.

IPC (Inter-processor Communication) registers 302 support a control-messaging protocol for communication between processing cores 200 over a relatively low-do bandwidth communication channel. High-bandwidth data can be passed between processing cores 200 via shared memory 204 in processor block 101.

Clock manager 303 is a programmable PLL/clock synthesizer that generates common audio clock rates from any selected one of a number of common input clock rates through the CLKIN port. Clock manager 303 includes an STC counter which generates time stamp information used by processor block 101 for managing playback and synchronization tasks. Clock manager 303 also includes a programmable timer to generate periodic interrupts to processor block 101.

Debug circuitry 304 is provided to assist in applications development and system debug using an external DEBUGGER and the DEBUG port, as well as providing a mechanism to monitor system functions during device operation.

A Digital Audio Output port 305 provides multichannel digital audio output in selected standard digital audio formats, such as the AAC audio coding format. A Digital Audio Transmitter 306 provides digital audio output in formats compatible with S/PDIF or AES/EBU.

In general, I/O registers are visible on both I/O buses, allowing access by either DSP-A (200a) or DSP-B (200b). Any read or write conflicts are resolved by treating DSP-B as the master and ignoring DSP-A.

There are several benefits to the dual-core processing approach. Processing cores (preferably DSP) 200a and 200b can work in parallel, executing different portions of an algorithm and increasing the available processing bandwidth by almost 100%. Preferably, the audio compression algorithms include a transform coding followed by fairly complex bit allocation routine at the encoder. On the decoder side the inverse is done. In other words, on the decoding site, the bit allocation is first recovered or "parsed" from the incoming bitstream, and then the inverse transform is performed. This is preferably a natural split between the loading of the dual DSPs. Preferably, the first DSP core 200a works on parsing the input bitstream, recovering all data fields, computing bit allocation and passing the frequency domain transform coefficients to the second DSP core 200b, which completes the task by performing the inverse transform (IFFT, IDCT, or other digital transform algorithm). While the second DSP 200b is finishing the transform for a channel n, the first DSP 200a is working on the channel n+1, making the processing parallel and pipelined. The tasks are overlapping in time, and as long as tasks are of the same general complexity, there will be minimal waiting on either DSP side. Shared memory 204 is preferably used as a high throughput channel, while communication registers serve as low bandwidth channel, as well as semaphore variables for protecting the shared resources.

In the discussion below, the AAC decoding approach is discussed for understanding the utility and advantages of the concepts claimed below. The actual claims, however, will determine the scope of the applicants' invention.

The AAC coding/decoding approach is encompassed within the MPEG-4 standard, and was originally a part of the MPEG-2 standard. Under the AAC approach, three types of coding have been defined. First, the lowest bit rate range between about 2 and 6 kbit/s, mostly used for speech coding at 8 kHz sampling frequency, is covered by parametric coding techniques. Second, coding at the medium bitrates between about 6 and 24 kbit/s uses Code Excited Linear Predictive ("CELP") coding techniques. In this region, two sampling rates, 8 and 16 kHz, are used to support a broader range of audio signals (other than speech). Third, for the bitrates typically starting at about 16 kbit/s, Time/Frequency ("T/F") coding techniques are applied. The audio signals in this region typically have bandwidths starting at 8 kHz.

The AAC approach provides a number of useful functions. For example, the AAC approach provides for a speed change functionality, which allows the change of the time scale without altering the pitch during the decoding process. This approach can, for example, be used to implement a "fast forward" function (data base search) or to adapt the length of an audio sequence to a given video sequence. A pitch change functionality allows the change of the pitch without altering the time scale during the encoding or decoding process. This can be used for example for voice alteration or Karaoke-type applications. Bit rate scalability allows a bitstream to be parsed into a bitstream of lower bit rate, such that the combination can still be decoded into a meaningful signal. The bit stream parsing can occur either during transmission or in the decoder. Bandwidth scalability is a particular case of bitrate scalability, whereby part of a bitstream representing a part of the frequency spectrum can be discarded during transmission or decoding. Encoder complexity scalability allows encoders of different complexity to generate valid and meaningful bitstreams. Decoder complexity scalability allows a given bitstream to be decoded by decoders of different levels of complexity. The audio quality, in general, is related to the complexity of the encoder and decoder used. Error robustness provides the ability for a decoder to avoid or conceal audible distortion caused by transmission errors.

The following AAC tasks are preferably performed on DSP-A 200a side: Noiseless decoding, inverse quantization and scaling Mid/Side ("M/S") decoding; prediction; intensity/coupling; and Temporal Noise Shaping ("TNS") filtering. A subband sample deinterleaving can also be performed on DSP-A 200a (in case of 8 short windows), so that the remaining portions of the AAC algorithm (performed on DSP-B 200b) operate on subband samples in the natural frequency order.

The data transfers from DSP-A 200a to DSP-B 200b are preferably carried out through the shared memory 204, on the raw data block level. More specifically, a package of 1024 subband samples (raw data block) plus some overhead information is preferably prepared on DSP-A side for every channel. When DSP-A 200a has the data ready and the shared memory 204 is free, the package is copied to shared memory, the shared memory becomes "busy," and DSP-A 200a proceeds to decoding the next channel. When DSP-B 200b picks up the data from shared memory, it sends a message to DSP-A to declare that the shared memory is free again.

The processing load for DSP-B 200b in this example is deterministic and regular, thus allowing for addition of post-processing functions, such as Dolby ProLogic, Bass Management, and Virtual Surround. The processing load for DSP-A 200a is not uniform in this example since data parsing and processing depends on the statistical properties of the encoded data.

Once the subband samples are sent to DSP-B 200b side, they are fed to a filterbank reconstruction module. This module preferably consists of an Inverse Modified Discrete Cosine Transform ("IMDCT"), and a window, and an overlap-and-add function.

The IMDCT processing can be expensive in memory requirements for an exemplary of a block size N=2048 samples. To conserve data memory and "MIPS" usage, the IMDCT is preferably performed in 3 actions: pre-twiddle, Inverse Fast Fourier Transform ("IFFT"), and post-twiddle, as follows. The pre-twiddle and the pre-IFFT bit-reverse loading are combined into a single pass which necessitates pre-ordering of the deinterleaved subband samples. This pre-ordering, however, can be done for free, during the data transfer from DSP-A 200a to DSP-B 200b.

Then, the in-place fixed-point IFFT is performed with dynamic scaling to prevent potential overflows during the 10-stage IFFT transform. The dynamic scaling is used in conjunction with the IMDCT normalization factor 2/N, (N=256 or 2048), to minimize the total number of fixed-point arithmetic right-shifts, and thus, maximizing data precision.

The fixed-point IFFT this is followed by an in-place post-twiddle which completes the IMDCT operation. It is important to note that only 1K 24-bit data memory words are needed for the IMDCT operation. An additional 1K words is needed per channel for the history, and 2K words per channel for final PCM output buffer. More importantly, the entire IMDCT operation meets/exceeds the specified precision requirements of the AAC decoder.

After reconstruction, the PCM samples are temporarily stored in PCM buffers, and sent to output FIFOs for playback. Given the dynamics of the AAC decode and the available MIPS, the PCM buffers and the output FIFOs have to be designed properly. The output FIFOs act as Direct Memory Access ("DMA") engines, feeding decompressed audio data to Digital-to-Analog Converters ("DACs"), and are designed at the hardware level, while the PCM buffers are the PCM sample reserves created in software to smooth out the data delivery-decode-playback dynamics. Preferably, the output FIFOs are chosen to be a 32-sample (24-bit) size.

Figure 4:
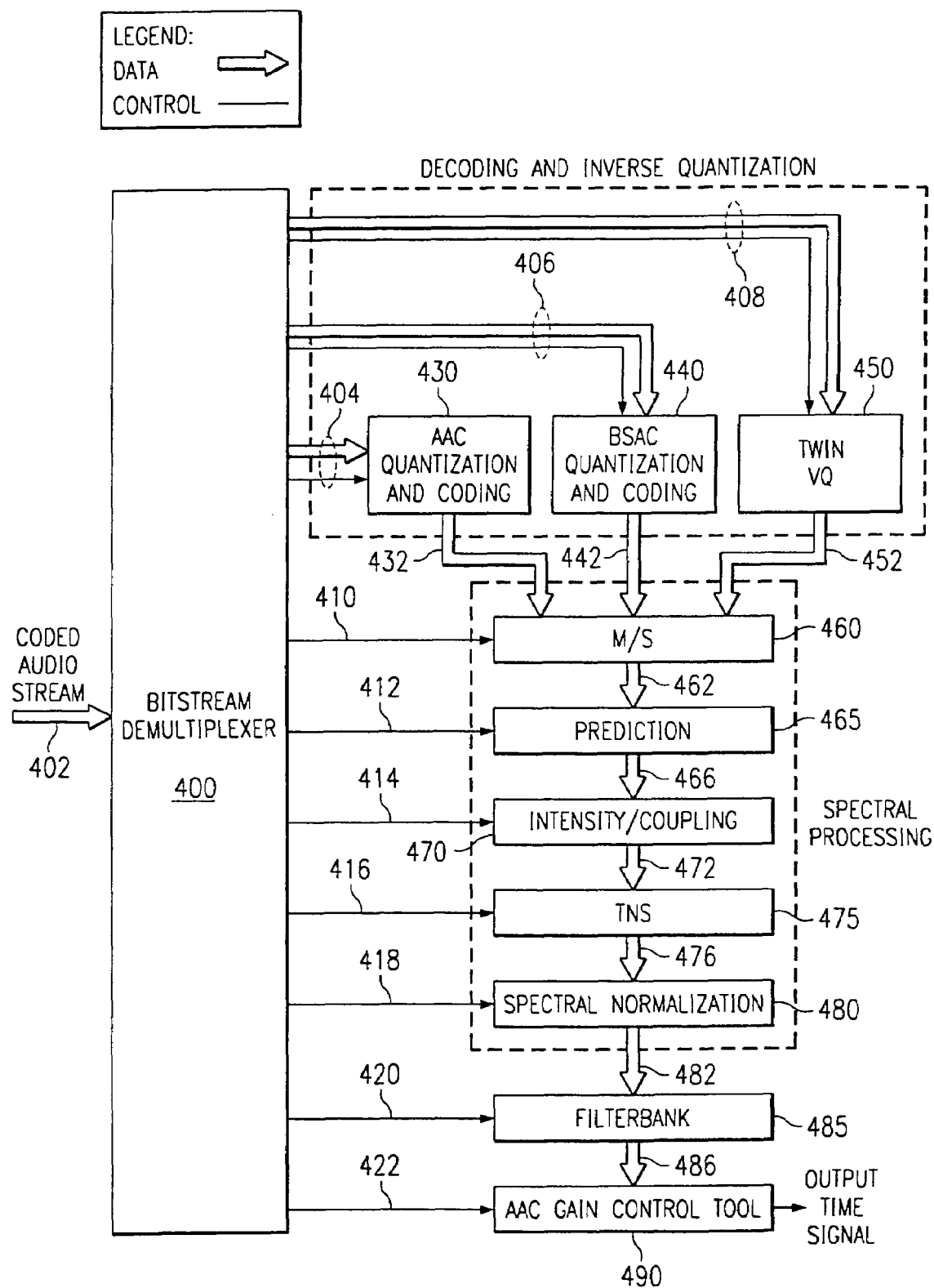
FIG. 4 is a functional diagram of an audio decoding architecture and method.

A preferred embodiment coding/decoding architecture is shown in FIG. 4. The data flow in this diagram is from left to right and from top to bottom. The preferred functions of the decoder are to find the description of the quantized audio spectra in the bitstream, decode the quantized values and other reconstruction information, reconstruct the quantized spectra, process the reconstructed spectra through whatever tools are active in the bitstream in order to arrive at the actual signal spectra as described by the input bitstream, and finally convert the frequency domain spectra to the time domain, with or without an optional gain control tool. Following the initial reconstruction and scaling of the spectrum reconstruction, other circuitry can be used to modify one or more of the spectra in order to provide more efficient coding. Preferably for these additional circuits, there is maintained an option to "pass through" the data without spectral modification.

The input to the bitstream demultiplexer tool 400 is the MPEG-4 T/F bitstream 402. The demultiplexer separates the bitstream into the parts for each tool, and provides each of the tools with the bitstream information related to that tool.

The output from the bitstream demultiplexer tool 400 is preferably the quantized (and preferably noiselessly coded) spectra represented by: (1) either the sectioning information and the noiselessly coded spectra 404 (AAC) or the Bit-Sliced Arithmetic Coding ("BSAC") information 406 or a set of indices of code vectors 408 (TwinVQ); (2) the M/S decision information 410; (3) the predictor state information 412; (3) the perceptual noise substitution (PNS) information; (4) the intensity stereo control information and coupling channel control information 414; (5) (TNS) information 416; (6) the filterbank control information 420; and (7) the gain control information 422.

The AAC noiseless decoding tool 430 takes information from the bitstream demultiplexer 400, parses that information, decodes the Huffman coded data, and reconstructs the quantized spectra and the Huffman and DPCM coded scalefactors.

The inputs to the noiseless decoding tool 430 are the sectioning information for the noiselessly coded spectra and the noiselessly coded spectra 404. The outputs of the noiseless decoding tool are the decoded integer representation of the scalefactors and the quantized values for the spectra 432.

The BSAC tool 440 provides an alternative to the AAC noiseless coding tool, which provides fine granule scalability. This tool takes information from bitstream demultiplexer 400, parses that information, decodes the Arithmetic coded bit-sliced data, and reconstructs the quantized spectra and the scalefactors. The inputs to the BSAC decoding tool are the noiselessly coded bit-sliced data and the target layer information to be decoded 400. The outputs from the BSAC decoding tool are the decoded integer representation of the scalefactors and the quantized value for the spectra 442.

The inverse quantizer tool takes the quantized values for the spectra, which were generated by the AAC noiseless decoding tool 430 or the BSAC tool 440, and converts the integer values to non-scaled, reconstructed spectra. This quantizer is a non-uniform quantizer. The input to the Inverse Quantizer tool is the quantized values for the spectra and the output of the inverse quantizer tool is the un-scaled, inversely quantized spectra. The scalefactor tool converts the integer representation of the scalefactors to the actual values, and multiplies the un-scaled inversely quantized spectra by the relevant scalefactors. The inputs to the scalefactors tool are the decoded integer representation of the scalefactors and the un-scaled, inversely quantized spectra. The output from the scalefactors tool is the scaled, inversely quantized spectra.

The M/S tool 460 converts spectra pairs from Mid/Side to Left/Right under control of the M/S decision information 410, improving stereo imaging quality and sometimes providing coding efficiency. The inputs to the M/S tool are the M/S decision information 410 and the scaled, inversely quantized spectra related to pairs of channels. The output from the M/S tool is the scaled, inversely quantized spectra (432, 442, 452) related to pairs of channels, after M/S decoding.

The scaled, inversely quantized spectra of individually coded channels are not processed by the M/S block, rather they are passed directly through the block without modification. If the M/S block is not active, all spectra are passed through this block unmodified.

The prediction tool 465 reverses the prediction process carried out at the encoder. This prediction process re-inserts the redundancy that was extracted by the prediction tool at the encoder, under the control of the predictor state information. This tool is implemented as a second-order backward adaptive predictor. The inputs to the prediction tool are the predictor state information 412 and the scaled, inversely quantized spectra 462. The output from the prediction tool is the scaled, inversely quantized spectra, after prediction is applied 466. If the prediction is disabled, the scaled, inversely quantized spectra are preferably passed directly through the block without modification. Alternatively, there is a low complexity prediction mode and a long term predictor provided.

The Perceptual Noise Substitution ("PNS") tool (not shown) implements noise substitution decoding on channel spectra by providing an efficient representation for noise-like signal components. The inputs to the perceptual noise substitution tool are the inversely quantized spectra and the perceptual noise substitution control information. The output from the perceptual noise substitution tool is the inversely quantized spectra. If either part of this block is disabled, the scaled, inversely quantized spectra are preferably passed directly through this part without modification. If the perceptual noise substitution block is not active, all spectra are passed through this block unmodified.

The intensity stereo/coupling tool 470 implements intensity stereo decoding on pairs of spectra. In addition, it adds the relevant data from a dependently switched coupling channel to the spectra at this point, as directed by the coupling control information 414. The inputs to the intensity stereo/coupling tool are the inversely quantized spectra 466 and the intensity stereo control information and coupling control information 414. The output from the intensity stereo/coupling tool is the inversely quantized spectra after intensity and coupling channel decoding 472. If either part of this block is disabled, the scaled, inversely quantized spectra are preferably passed directly through this part without modification. The intensity stereo tool and M/S tools are arranged so that the operation of M/S and Intensity stereo are mutually exclusive on any given scalefactor band and group of one pair of spectra.

The (TNS) tool 475 implements a control of the fine time structure of the coding noise. In the encoder, the TNS process has flattened the temporal envelope of the signal to which it has been applied. In the decoder, the inverse process is used to restore the actual temporal envelope(s), under control of the TNS information. This is done by applying a filtering process to parts of the spectral data. The inputs to the TNS tool are the inversely quantized spectra 472 and the TNS information 416. The output from the TNS block is the inversely quantized spectra 476. If this block is disabled, the inversely quantized spectra are preferably passed through without modification.

The filterbank tool 485 applies the inverse of the frequency mapping that was carried out in the encoder, as indicated by the filterbank control information 420 and the presence or absence of gain control information. An IMDCT is preferably used for the filterbank tool. If the gain control tool is not used, the IMDCT in the standard AAC mode input preferably consists of either 1024 or 128 spectral coefficients, depending of the value of window_sequence. If the gain control tool is used, the filterbank tool is preferably configured to use four sets of either 256 or 32 coefficients, depending of the value of window_sequence.

The inputs to the filterbank tool are the inversely quantized spectra 476 and the filterbank control information 420. The output(s) from the filterbank tool is (are) the time domain reconstructed audio signal(s) 486. The filterbank tool may be constructed from among the following configurations: a) 1024 or 128 shift-length-type with the option to select two window shapes (AAC); b) 4× switchable 256 or 32 shift-length-type with the option to select two window shapes (AAC); c) 2048 or 512 or 128 shift-length-type with a sine window as defined for TwinVQ; and d) 960 or 120 shift-length-type with the option to select two window shapes (AAC-derived).

When present, the gain control tool (not shown) applies a separate time domain gain control to each of 4 frequency bands that have been created by the gain control PQF filterbank in the encoder. Then, it assembles the 4 frequency bands and reconstructs the time waveform through the gain control tool's filterbank.

The inputs to the gain control tool are the time domain reconstructed audio signal(s) and the gain control information. The output from the gain control tool is the time domain reconstructed audio signal(s). If the gain control tool is not active, the time domain reconstructed audio signal(s) are passed directly from the filterbank tool to the output of the decoder. This tool is used for the Scaleable Sampling Rate ("SSR") profile only.

The spectral normalization tool 480 converts the reconstructed flat spectra 476 to the actual values at the decoder. The spectral envelope is specified by LPC coefficients, a Bark scale envelope, periodic pulse components, and gain. The input to the spectral normalization tool is the reconstructed flat spectra 476. The output from the spectral normalization tool is the reconstructed actual spectra 482.

The TwinVQ 450 tool converts the vector index to a flattened spectra at the decoder by means of table look-up of the codebook and inverse interleaving. Quantization noise is minimized by a weighted distortion measure at the encoder instead of an adaptive bit allocation. This is an alternative to the AAC quantization tool.

The input to the TwinVQ tool is a set of indices of the code vector 408. The output from the TwinVQ tool is the reconstructed actual spectra 452.

The above audio coding/decoding tools are used, for example, in the AAC architecture specification which is set out in the ISO/IEC CD 14496-3 Subpart 4 Standard, entitled "Information Technology—Coding of Audiovisual Objects; Part 3: Audio; Subpart 4: Time/Frequency Coding, dated May 15, 1998, which is incorporated by reference herein.

Challenges raised by many current audio coding/decoding architectures is that they are typically designed to be implemented using floating point DSPs and that such implementations typically have significant memory needs. In a preferred embodiment, these challenges are met with a dual fixed-point processor (preferably DSP) implementation which saves both memory and processor throughput, and furthermore provides increased data precision throughout the decoding process. Preferably, the dual-DSP 200*a* architecture balances the processor load between the two DSPs. For example, in an AAC embodiment, a front-end DSP 200*a* can be provided for parsing and processing the incoming compressed data and generating the frequency-domain coefficients for each channel. The back-end DSP 200*b* performs the inverse transform, windowing, and output PCM buffer management. While the back-end DSP is working on the transform for one channel, the front-end DSP preferably prepared the subband samples for the next channel, making the processing parallel and pipelined.

Figure 6:
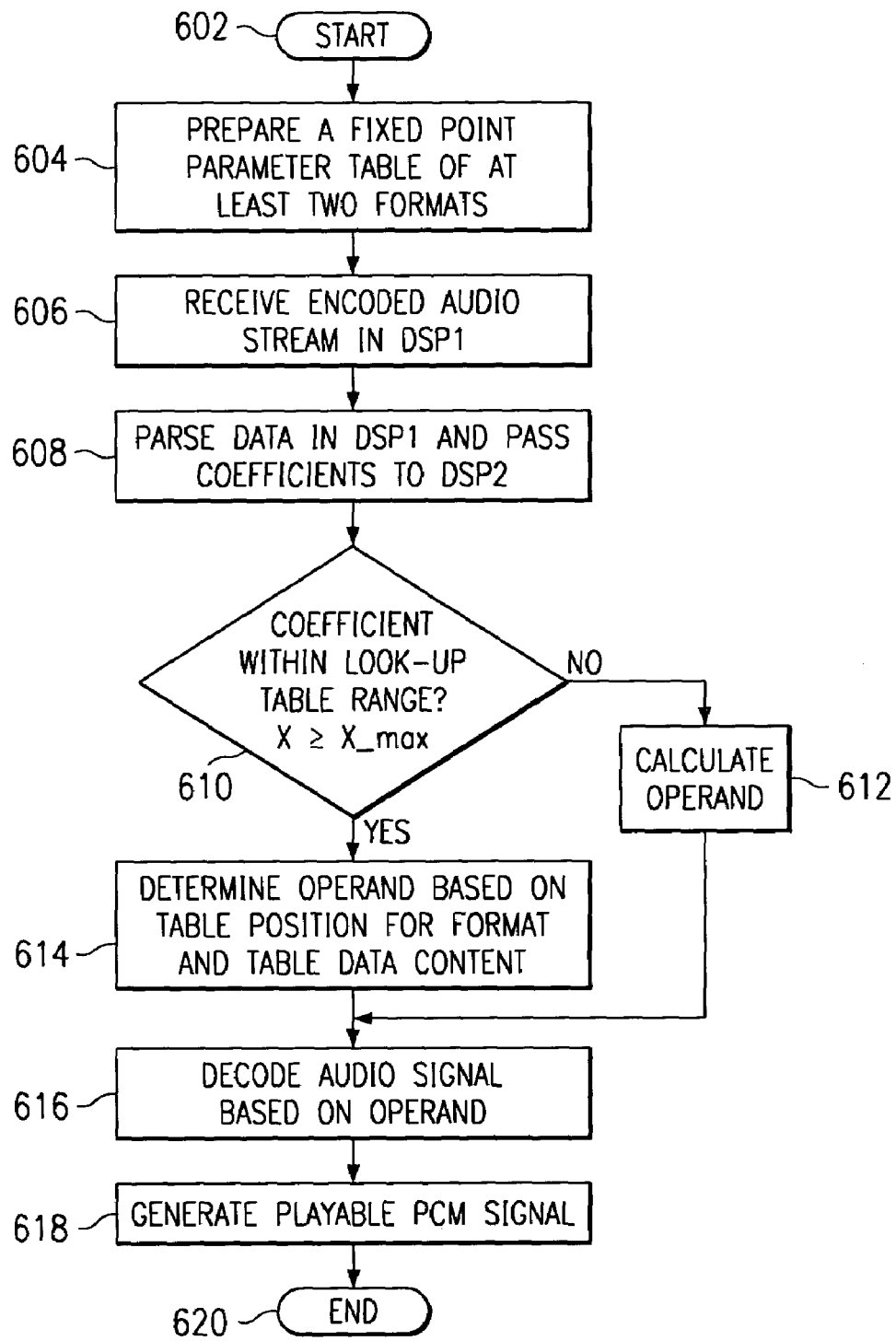
FIG. 6 is a functional diagram of an embodiment of the described digital audio decoding system.

Referring again to FIG. 2 and now also to the flow diagram of FIG. 6, the division of processing between the two processors 200*a*-200*b* are provided in greater detail. Starting the process of decoding the encoded bitstream at the start block 602, a fixed point parameter table is provided in first action 604. The table is preferably stored in program memory 201*a*-202*a*, and it contains operands of a given length.

The system then receives, beginning at box 606, the encoded audio stream. At box 608, DSP-A 200*a* preferably synchronizes to the exemplary AAC data bitstream by searching for format-specific sync patterns. Once the synchronization to the AAC bitstream is established, the bitstream parsing begins. The flexible AAC channel configurations are recognized, the sectioning information is extracted, and the scale factor and subband data is recovered using various AAC tools, such as Huffman decoding, block decoding and differential decoding.

Huffman Decoding. The Huffman decoding, which is still occurring within box 608, assumes presence of codebook tables and may require substantial memory resources. These tables, however, can be optimized for storage (in program memory 201*a*-202*a*) and use as follows. The Huffman codewords, their length fields, and output quantization levels (indexes) can be packed together in 24-bit word-wide tables. For example, the spectrum Huffman codebook 1 in ISO/IEC 13818-7 has codewords at most 11-bits long, the maximum quantization level is 81 (takes 7 bits to represent), and the length field can be represented by 4 bits (length<11 bits). Thus, for every table entry, we can combine 11+7+4=22 bits together into 24-bit data memory words. This representation allows for very efficient Huffman codebook representation, while adding negligible DSP processing overhead. The table entries are arranged in the codeword-length, non-decreasing order, so that the decoder checks for the most probable codewords first. Because of this, the length fields in the packed Huffman codebook tables can be further differentially encoded, so that only the additional number of bits to parse from the bitstream (with respect to the previous table entry) is stored.

Still during action 608, after the subband samples and scale factors have undergone the noiseless decoding (Huffman), the subband samples have to be degrouped into pairs or quads. The degrouping (deblocking) can be done either using the table lookup or the algorithmic (division) approach, based on the memory vs. MIPS trade-off. As mentioned before, the AAC decompression algorithm often is implemented in a 32-bit floating-point DSP implementation. The non-uniform inverse quantization (power of 4/3) and exponential nature of the scale factor gain function, defined on a wide input range may present a significant challenge to an implementation on a fixed-point DSP engine. Provided here, however, is a method and system for inverse quantization and scaling that can be efficiently implemented on an exemplary 24-bit fixed-point DSP architecture using combination of smart scaling, table lookups, and log- and exp-function approximations.

After completing its processing of the incoming bitstream at boxes 606 and 608, the first processor 202*a* passes the coefficients to the second processor 202*b* to use for decoding the incoming data stream. "Inverse quantization" is a part of that decoding process in that quantized data is interpreted and transformed to a format that can be more directly applied in the reproduction of the incoming encoded audio signal. At box 610, in this embodiment, the second processor 202*b* begins the inverse quantization action as described below.

Inverse Quantization. The inverse quantization in AAC is described by the formula $y=\operatorname{sign}(x)|x|^{4/3}$. In this formula, x is the quantized subband sample and in the embodiment the absolute value of x is less than 8192. Further, y is the inversely quantized subband sample. This $\operatorname{sign}(x)|x|^{4/3}$ is preferably performed for every non-zero subband sample, thus posing a significant processing load if the result is to be calculated each time. A table lookup approach, however, for 8192 input elements, also poses difficulties due to memory requirements for the storage of the tables. A compromise between the table lookup and the calculation is adopted in the preferred embodiment. Depending on the available data memory (x_max elements), a table of x_max elements can be created to lookup the inversely quantized coefficients y.

As illustrated by the decision block 610, there are a certain number of input x values for which the output y is looked-up in the look-up table—this "look-up range" is determined by comparing x to x_max, and for those instances where x is less than x_max, looking the value of "y" up in the table according to action 614. For the rest of the input values where the absolute value of x is greater than or equal to x_max, but still less than the exemplary 8192, a calculation of y can be performed rather than using a table look-up according to action 612. In a computer-based implementation, the formula is calculated in action 612 using log- and exp-function approximations as described below.

For the purposes of representing the first y_max inversely quantized subband samples in the 24-bit word table, the following input index (x) segmentation is preferably performed. For $|x|<2$, the 24.0 signed fractional format is adopted for the output y, i.e., all 24 bits are used to represent the integer portion of the result, and 0 bits is used for the fractional portion. If $2<=|x|<4$, the 21.3 signed fractional format is used. If $4<=|x|<8$, the 20.4 signed fractional format is used. And so on, until x=x_max. Thus, to know what is the output fractional format, one needs to figure out which segment the current index belongs to. This can be efficiently done using the binary search of a small index-boundary lookup table.

Generally, then, the process of inverse quantization for $|x|<x\_max$ consists of two actions: (1) finding the fractional representation format of y and (2) looking up y.

The on-the-fly inverse quantization for indexes ($|x|>=x\_max$) is performed using the following numerical calculation according to box 616:

First, the input indexes are represented as follows: $x=2^{13-N} \cdot x_n$, where $x_n \in [0.5, 1]$, and N is a number of right shifts ($N<=13$) needed to make this representation. The output y can be written as:

$$y = 2^{\log_2 x^{\frac{4}{3}}} = 2^{\frac{4}{3}(13-N)} \cdot 2^{\frac{4}{3}\log_2 x_n} \quad (1.1)$$

Equation (1.1) can be approximated using the following Taylor series (second order) log- and exp-approximations:

$$\log_2 x_n \approx a_0 + a_1 x_n + a_2 x_n^2, \quad (1.2)$$

$$2^z \approx b_0 + b_1 z + b_2 z^2, \quad (1.3)$$

where $$x_n \in [0.5, 1], \log_2 x_n \in [-1, 0], \text{ and } z \in \left[-\frac{4}{3}, 0\right]$$

can be fully numerically evaluated. Orders of approximation are chosen based on a trade-off between processor loading and accuracy requirements. Preferably, the second order approximations are used. The constants $a_0$, $a_1$, $a_2$, $b_0$, $b_1$ and $b_2$ can be calculated using a polynomial fit program.

Scale Factor Gain Calculation and Scaling. The calculation of the scale factor gain is another example how combination of a table lookup and calculations can lead to very efficient decoder implementations. The scale factor gain in AAC is calculated as follows: (1.4)

$$g = 2^{\frac{1}{4}(S_f - 100)}, \quad (1.4)$$

where $S_f$ is the scale factor index decoded from the stream using differential decoding, and in theory, can be very large. In the preferred embodiment, the range $|\exp|=\frac{1}{4} \cdot |S_f - 100| < 24$ produces the most meaningful range for the exemplary 24-bit DSP engines.

Use of the scale factor gain (1.4) can produce 2×4×24 numbers for the input parameter range of interest, where factor 2 comes from the positive and negative values of exp, factor 4 comes from the modulo 4 characteristic of the function, and factor 24 comes from the range of exp. Thus, a 192 element lookup table can be used in calculating the scale factor gain. The fractional format of table elements is known to a decoder in order to use these values properly. Similar to the inverse quantization solution hereinabove [in 3.1.2], the input indexes to a table can be segmented into power-of-2 groups and represented with appropriate fractional formats. The same binary search approach (to a different index-boundary table) can be used here, at a small processing cost.

Furthermore, (1.4) can be represented with only 4 table elements and the associated scaling (shifting) factor, for the following reasons: First, the scale factor gain for negative exponents ($-24<\exp<0$) is equal (up to a $2^{24}$ factor) to a scale factor gain for the (24-exp) index. Therefore, half of the table entries can be eliminated. Second, (1.4) can be represented as $$2^n \cdot 2^{\frac{i}{4}},$$

where n is a whole number, and i can be 0, 1, 2, or 3. Therefore, by incorporating the n in the format lookup table and remembering the sign of the exponent, the scale factor gain calculation can be reduced to a 4-element table lookup, plus the binary segmentation search of the format table.

Finally, having the formats (exponents) and values (mantissas) for both the inversely quantized coefficient and the scale factor gain, one can perform the scaling and format adjustment on a 24-bit fixed-point DSP, thus emulating the floating-point arithmetic. Thus, full source data precision in AAC decoding can be maintained using a 24-bit fixed-point arithmetic.

Figure 5:
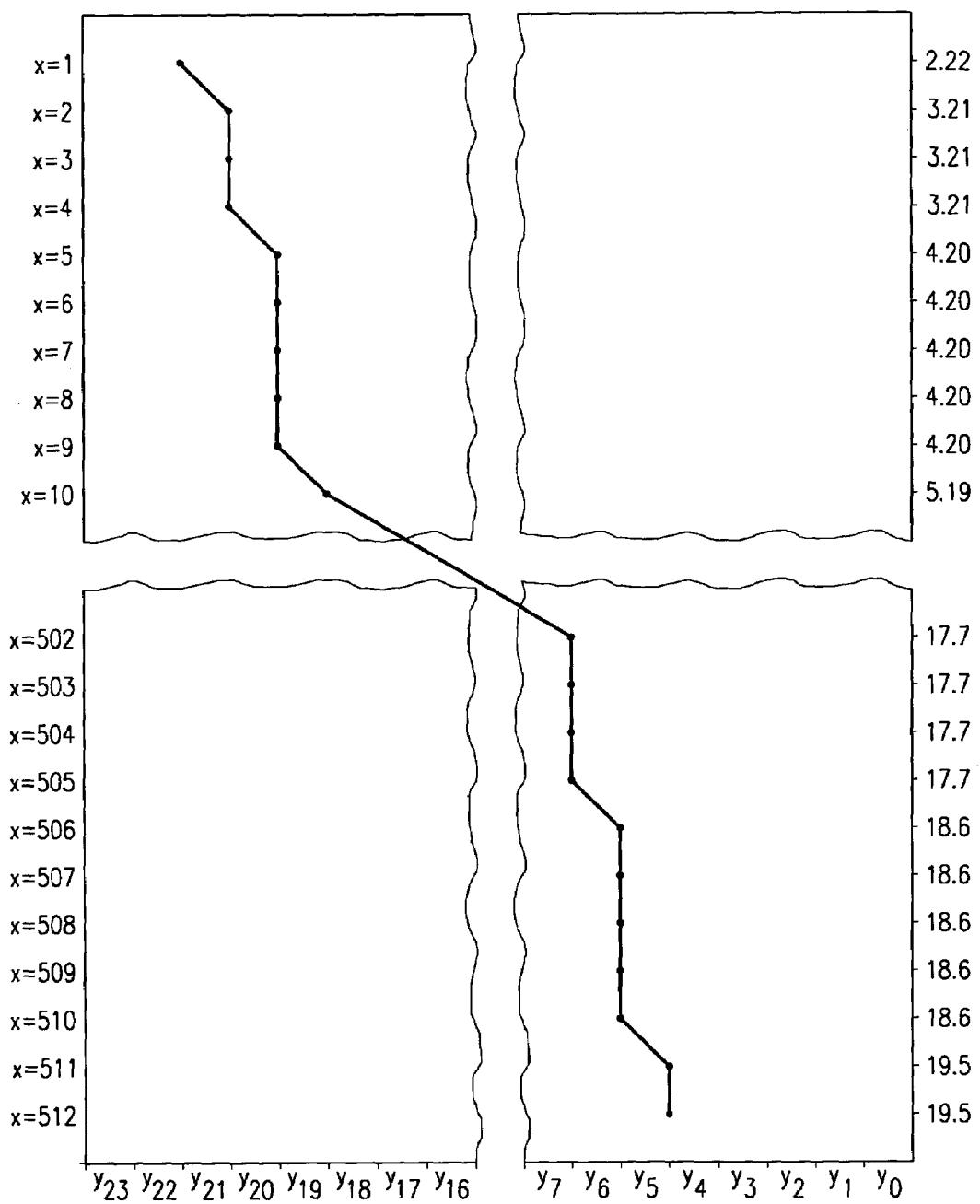
FIG. 5 illustrates a described embodiment of a look-up table in which pre-computed functions are stored for different values of the input variable.

As illustrated in FIG. 5, the embodiment described here uses a varying allocation of the bits of the fixed word length between the integer portion and the decimal portion. This allows most effective use of the available word length. Without the varying allocation, there would typically be filler bits to the left of the integer portion of the word or to the right of the decimal or fractional portion of the word. For instance, had a fixed 12.12 format been adopted, at the upper part of FIG. 5, the useful information would not begin until 10 bits to the left of the integer portion had been wasted and the low amplitude resolution could still have only been represented by the same 12 bits to the right of the decimal. At the other extreme, at the higher values of x, the output y would still be limited at the integer side to 12 bits, while there would still have been carried 12 bits—many of the decimal bits adding little or no relevant information to the higher range output signal.

The smart-look up technique described above for use in a fixed-point arithmetic DSP for digital audio decoding can be applied in several of the computations required in the digital audio decoding process. For example, the above formulas (1.1)-(1.3) and the associated un-numbered formulas are used to compute the inverse quantization of the digital audio codes, whereas formula (1.4) and any associated formulas are used to compute the scale factor gain. In either case, a look-up table having a varying format for the codes stored in the look-up table can be used for part of the variable range of the formulas whereas the remainder of the variable range can be mathematically computed "on the fly."

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

For example, although AAC decoding is described as the digital audio decoding application above, but the principles described above can be applied to other formats of encoded digital audio data. Different functions described above may be implemented in hardware, software, or firmware. The described processing cores may be general purposes microprocessors or Reduced Instruction Set Computers ("RISC"), the latter of which would specifically include DSPs. In any instance, the specific elements of the embodiments described above can often be replaced by other elements which can perform the described functions. It is therefore, contemplated that the claims will cover such modifications or embodiments.

What is claimed:

1. A digital audio decoder for receiving an encoded audio signal and decoding the audio signal, the digital audio decoder comprising:
    an input which receives the encoded audio signal;
    a program memory circuit which is operable to store a program by which the digital audio decoder operates;
    a data memory circuit which is operable to store pre-computed calculations as operands for use in the decoding operation, the operands having an integer part and a fractional part within a fixed word length, with the division of bits between such parts having at least two formats in the data memory circuit;
    a control circuit connected to the input, the program memory circuit and the data memory circuit, the control circuit having a fixed-point mathematical operating system, the control circuit further being operable to decode the encoded audio signal according to the program stored in the program memory circuit, to retrieve and interpret the operands from the data memory circuit, and to calculate an unencoded audio signal based on mathematical formulas stored in the program memory circuit and based upon the further pre-computed calculations stored in the data memory circuit.

2. The digital audio decoder of claim 1 wherein the program memory circuit is a part of a different device than is the data memory circuit.

3. The digital audio decoder of claim 1 wherein the program memory circuit is a part of the same device as is the data memory circuit.

4. The digital audio decoder of claim 1 wherein the control circuit is implemented by two digital signal processors in communication with each other.

5. The digital audio decoder of claim 4 wherein the two digital signal processors communicate with each other through a shared memory circuit.

6. The digital audio decoder of claim 1 wherein said encoded audio signal is with a non-uniform quantization.

7. The digital audio decoder of claim 6 wherein said non-uniform quantization is by a power of $4/3$ quantization.

8. The digital audio decoder of claim 1 wherein said pre-computed calculations are stored as entities in a table and wherein each entry of the table is comprised of an integer and a fractional part.

9. The digital audio decoder of claim 8 wherein each entry has a fixed number of bits and wherein the allocation of bits between the integer and fractional parts is different between at least two of the table entries.

10. The digital audio decoder of claim 8 wherein the fractional part of at least one of said table entries comprise zero bits.

11. The digital audio decoder of claim 1 wherein said control circuit comprises a pair of digital signal processors.

12. The digital audio decoder of claim 1 wherein the mathematical formulas stored in the program memory comprise a Taylor expansion representation of a logarithm of a first factor of a quantized subband sample.

13. The digital audio decoder of claim 1 wherein the control circuit uses the precomputed calculations stored in the data memory circuit for quantized subband samples having an absolute value less than a predetermined value, and uses the mathematical formulas for quantized subband samples having an absolute value greater than the predetermined value.

14. The digital audio decoder of claim 12 wherein the mathematical formulas stored in the program memory further comprise a Taylor expansion representation of an exponential function of a second factor of the quantized subband sample.

15. The digital audio decoder of claim 14 wherein the Taylor expansion representation comprises a second order approximation.

* * * * *